United States Patent [19]

Jones

[11] Patent Number: 5,205,523
[45] Date of Patent: Apr. 27, 1993

[54] PORTABLE LIGHT-WEIGHT HANGER

[76] Inventor: Niles G. Jones, 3185 Robertson Rd., Pensacola, Fla. 32507

[21] Appl. No.: 804,682

[22] Filed: Dec. 11, 1991

[51] Int. Cl.⁵ .......................................... F16B 45/00
[52] U.S. Cl. .................. 248/218.4; 182/92; 248/231; 248/304
[58] Field of Search .............. 248/218.4, 205.1, 231, 248/304, 505; 182/92, 189

[56] References Cited

U.S. PATENT DOCUMENTS

| 409,239 | 8/1889 | Roller | 248/304 |
|---|---|---|---|
| 3,463,436 | 8/1969 | Foster, Jr. | 248/231 X |
| 3,678,886 | 7/1972 | Tibbet | 248/231 X |
| 4,722,501 | 2/1988 | Ruhl | 248/218.4 |
| 5,086,873 | 2/1992 | George | 182/92 |

Primary Examiner—Carl D. Friedman
Assistant Examiner—Derek J. Berger
Attorney, Agent, or Firm—Kelly D. Corley

[57] ABSTRACT

A portable light-weight hanger for supporting a bow, rifle, or the like from a tree without damaging the tree. The hanger comprises a J-shaped elongated member having an upper rear portion and a lower front finger projecting forwardly therefrom. A relatively small hollow tube extends horizontally through the upper rear portion, and a flexible cord extends entirely through the hollow tube.

9 Claims, 1 Drawing Sheet

PORTABLE LIGHT-WEIGHT HANGER

The invention relates to a portable light-weight hanger of particular utility for attaching to a tree trunk or the like in order to temporarily hang a bow, gun, or similar object thereon without damaging the tree.

A number of portable hangers have been proposed that may be attached to a tree trunk or the like for similar purposes. These typically are relatively expensive and complicated. For example, Ruhl U.S. Pat. No. 4,722,501 discloses a ratchet mechanism for tightening a belt around a tree trunk. Loeb U.S. Pat. No. 3,022,898 discloses a pair of depending hooks, with a belt and buckle for engirding the trunk. Redman U.S. Pat. No. 939,318 likewise uses a belt and buckle arrangement together with a hook formed from bent heavy wire, the latter including prongs apparently intended to penetrate and thus damage the tree.

Another type of device is relatively heavy and expensive, and is intended to function as steps for climbing trees, utility poles, and the like. For example, Day U.S. Pat. No. 2,097,562 discloses a device used as a pole step, including pointed regions intended to penetrate the surface of a uility pole. Southard U.S. Pat. No. 4,620,610 likewise discloses a relatively heavy step intended to be used in climbing a tree, with a braided rope having one end permanently affixed to and another end removably attachable to a hook, with a relatively heavy step mechanism hanging from the hook.

These and other difficulties of the prior art are avoided by the present invention, which provides a simple and inexpensive hanger suitable for hanging objects from a tree trunk without damage to the tree.

According to a first primary aspect of the invention, there is provided a portable hanger comprising a first elongated member in a given vertical plane, the first member comprising an upper rear portion and a lower front finger projecting forwardly therefrom. The hanger further comprises a hollow tube having an intermediate region extending generally horizontally through the upper rear portion in a second vertical plane forming a right angle with the given vertical plane. The tube comprises first and second arms extending outwardly from the upper rear portion. The hanger further comprises a flexible cord extending entirely through the tube, the cord having two ends and being more than twice as long as the tube.

According to another aspect of the invention, the first member is also a hollow tube.

According to another aspect of the invention, the arms extend outwardly from the upper rear portion at a small angle rearwardly of the second vertical plane.

According to another aspect of the invention, the intermediate region has an outer surface welded to the first member.

According to another aspect of the invention, the first member and the tube are each made of a rust resistant material.

According to another aspect of the invention, the rust resistant material is stainless steel.

According to another aspect of the invention, the cord has a loop formed on one of the ends.

According to another aspect of the invention, the member is substantially J-shaped.

Other aspects will inpart appear hereinafter and will in part be apparent from the following detailed description taken together with the accompanying drawings, wherein.

Figure 1:
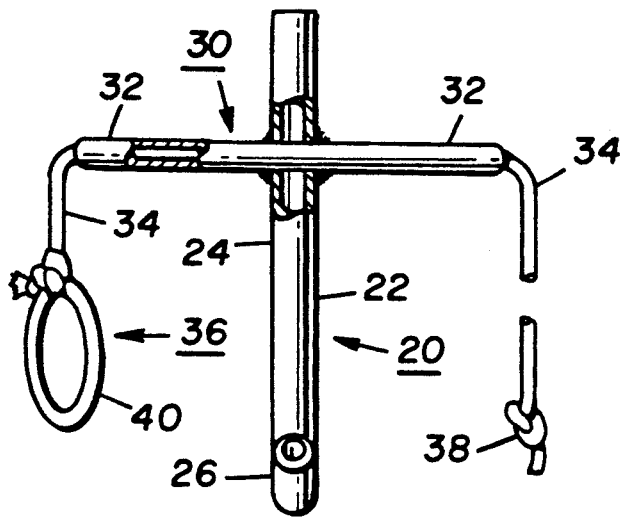
FIG. 1 is a front elevational view, partly broken away, of the preferred embodiment of the hanger according to the invention.
Figure 2:
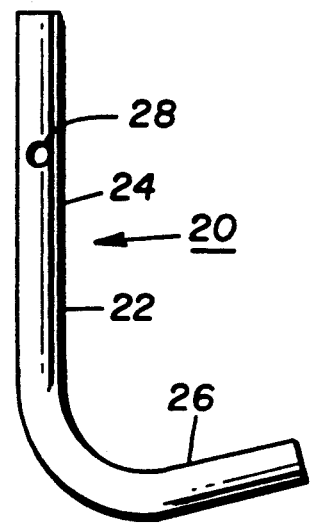
FIG. 2 is a side elevational view of the J-shaped member prior to installation of the transverse hollow tube.

Referring to FIGS. 1 and 2, hanger 20 comprises a first elongated substantially J-shaped member 22 in a given vertical plane, member 22 comprising upper rear portion 24 and lower front finger or hook 26 projecting forwardly therefrom. Member 22 is preferably formed from a stainless steel tube, for example ⅜ inch (0.95 cm) diameter and about 7¼ inches (18 cm) long prior to being bent into the J-shape. Aperture 28 is formed in upper rear portion 24, extending entirely through upper rear portion 24 along a horizontal axis in a vertical plane perpendicular to the given plane. As a specific example, aperture 28 may have a diameter of ¼ inch (0.635 cm).

In the preferred embodiment using the above disclosed member 22, hollow tube 30 is installed through aperture 28 so that an intermediate region of tube 30 is received in aperture 28. Tube 30 accordingly provides a passageway that passes through upper rear portion 24. Tube 30 comprises arms 32 extending outwardly from upper rear portion 24. In the specific example, tube 30 is a 4¼ inch (10.8 cm) long stainless steel tube having an outer diameter of ¼ inch (0.635 cm). The outer surface of tube 30 is welded to upper rear member 24 around the edges of aperture 28.

Flexible cord 34 extends entirely through tube 30, and comprises ends 36 and 38. Loop 40 is preferably formed in end 36, for a purpose to be described. Cord 34 is preferably a braided cord, and may be, for example, about 7 feet (213 cm) in length.

Figure 4:
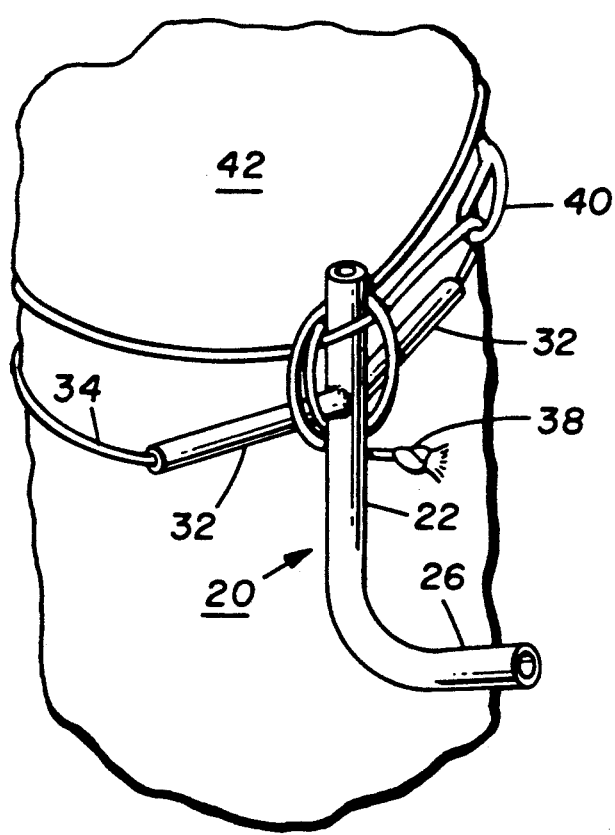
FIG. 4 is a schematic isometric view of the hanger installed on a tree.
Figure 3:
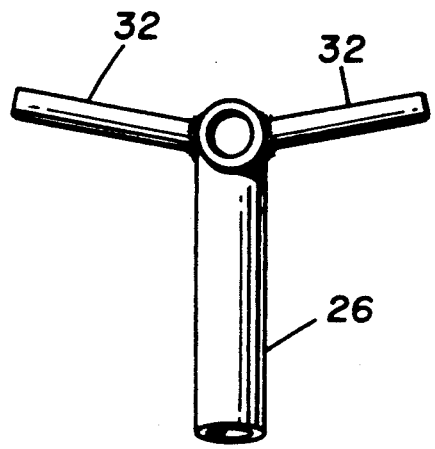
FIG. 3 is a top plan view of the hanger.

FIG. 4 illustrates the hanger of the invention installed on tree 42. Cord end 38 is passed around tree 42 and through loop 40. End 38 is then passed back around tree 42 in the opposite direction until cord 34 is taut. Next, end 38 is wedged between upper rear portion 24 and tree 42, passing in several loops above and below arms 32. This arrangement avoids the need to tie a knot in cord 34, and can readily be accomplished even if the user is wearing gloves or mittens.

Since cord 34 passes entirely through tube 30, if one of the tube arms 32 were to break, member 22 would still remain in place.

The hanger is light and may be carried in ones pocket when not in use.

I claim:

1. A portable hanger comprising:
   (a) a first elongated member in a given vertical plane, said first member comprising an upper rear portion and a lower front finger projecting forwardly therefrom;
   (b) a relatively small hollow tube having an intermediate region extending generally horizontally through said upper rear portion in a second vertical plane forming a right angle with said given vertical plane, said tube comprising first and second arms extending outwardly from said upper rear portion; and
   (c) a flexible cord extending entirely through said tube, said cord having two ends and being more than twice as long as said tube.

2. The hanger defined in claim 1, wherein said first member is a hollow tube having a larger transverse dimension than said relatively small hollow tube.

3. The hanger defined in claim 1, wherein said arms extend outwardly from said upper rear portion and rearwardly of said second vertical plane, said arms forming acute angles with said second vertical plane.

4. The hanger defined in claim 1, wherein said intermediate region has an outer surface welded to said first member.

5. The hanger defined in claim 1, wherein said first member and said tube are each made of a rust resistant material.

6. The hanger defined in claim 5, wherein said rust resistant material is stainless steel.

7. The hanger defined in claim 1, wherein said cord has a loop formed on one of said ends.

8. The hanger defined in claim 1, wherein said finger extends upwardly through the horizontal plane.

9. The hanger defined in claim 1, wherein said first member is substantially J-shaped.

* * * * *